Figure 1:
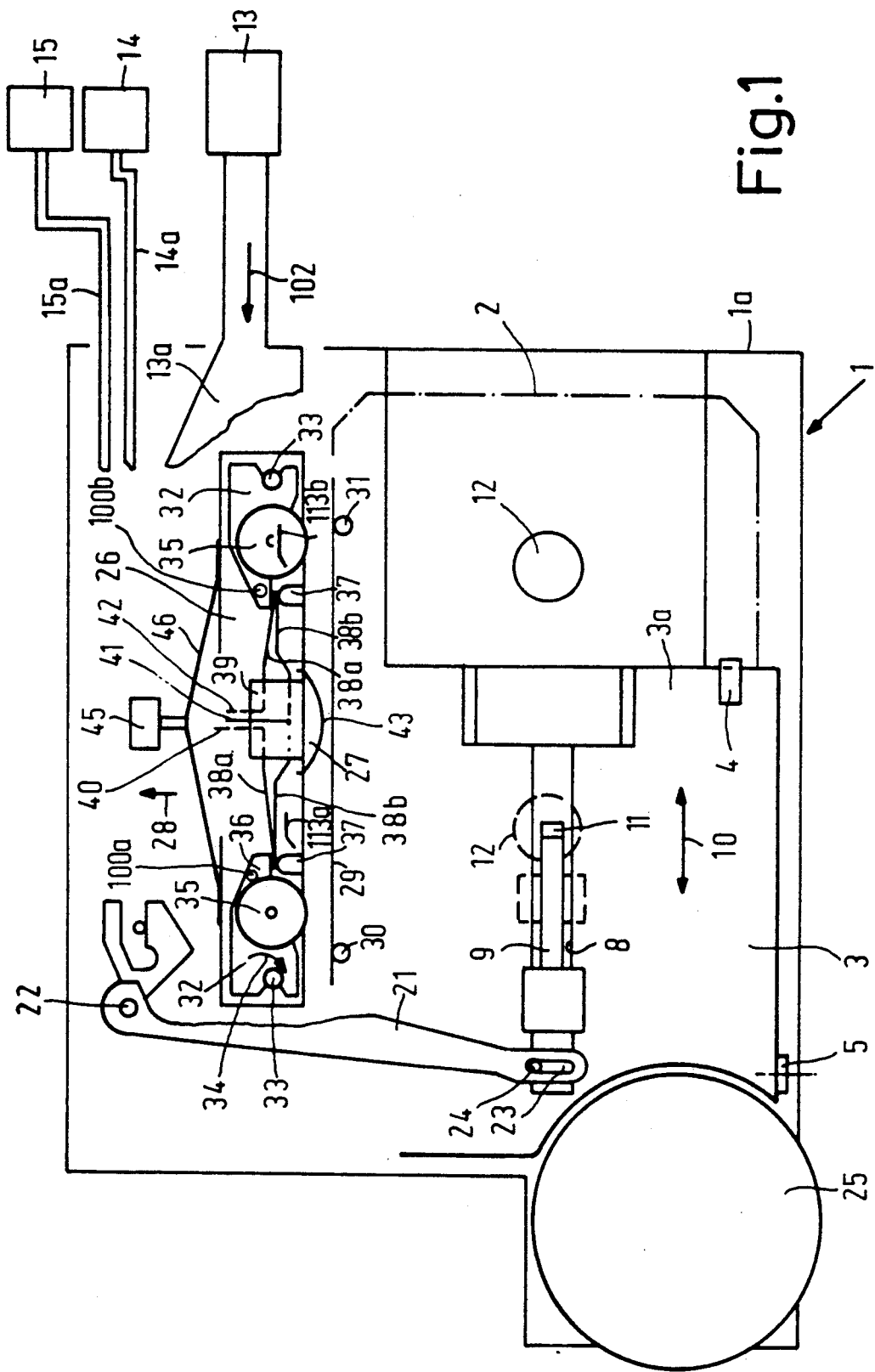

United States Patent [19]

Kunze

[11] Patent Number: 5,023,742

[45] Date of Patent: Jun. 11, 1991

[54] MAGNETIC-TAPE-CASSETTE APPARATUS INCLUDING PINCH ROLLER-OPERATED SWITCHING ELEMENTS FOR PRODUCING MUTING AND/OR TRACK DIRECTION DETECTION

[75] Inventor: Norbert Kunze, Ehringshausen, Fed. Rep. of Germany

[73] Assignee: U.S. Philips Corporation, New York, N.Y.

[21] Appl. No.: 378,553

[22] Filed: Jul. 11, 1989

[30] Foreign Application Priority Data

Jul. 30, 1988 [DE] Fed. Rep. of Germany ....... 3826007

[51] Int. Cl.[5] .............................................. G11B 5/008
[52] U.S. Cl. .................................. 360/137; 360/96.2
[58] Field of Search ............................. 360/96.2–96.5, 360/93, 137, 90

[56] References Cited

U.S. PATENT DOCUMENTS

| | | | |
|---|---|---|---|
| 3,810,237 | 5/1974 | Nozawa | 360/96.2 |
| 3,838,459 | 9/1974 | Bettini et al. | 360/96.2 |
| 4,149,203 | 4/1979 | Kobayashi et al. | 360/105 X |
| 4,346,415 | 8/1982 | Tomabechi et al. | 360/105 |
| 4,442,467 | 4/1984 | Ikedo | 360/96.2 X |
| 4,564,873 | 1/1986 | Hashimoto | 360/90 |
| 4,583,139 | 4/1986 | Saito | 360/96.2 |
| 4,623,945 | 11/1986 | Deutsch et al. | 360/96.5 |

Primary Examiner—John H. Wolff

[57] ABSTRACT

The invention relates to a magnetic-tape-cassette apparatus (1) comprising a deck for playing magnetic-tape cassettes (2), containing a magnetic tape (29). The deck includes at least one drivable capstan (30 or 31) and a pressure roller counterpart (35) which can be applied to the capstan. The pressure roller (35) and a magnetic head (27), past which the magnetic tape (29) is moved, are arranged on a head-mounting plate (26) which is withdrawn in a rest or fast-wind position and which is moved forwards in a play position. In the latter position the pressure roller (35), which is supported on a pivotable support (32) of the head-mounting plate (26), is pivoted against the capstan (30 or 31) by the support. Switching elements (39), for producing muting and/or track direction detection signals, are arranged on the head mounting plate (26) adjacent the pressure-roller supports (32), which elements can be set to a switch position by the pressure-roller supports (32) when these supports are pivoted as a result of the pressure rollers being applied to the capstans during operation of the deck. In this position the switching elements (39) provide muting and/or track direction detection at the magnetic head (27) or the preamplifier of the deck (1).

6 Claims, 2 Drawing Sheets

MAGNETIC-TAPE-CASSETTE APPARATUS INCLUDING PINCH ROLLER-OPERATED SWITCHING ELEMENTS FOR PRODUCING MUTING AND/OR TRACK DIRECTION DETECTION

The invention relates to a magnetic tape cassette apparatus comprising a deck for playing magnetic tape cassettes which for playing a magnetic tape comprises at least one drivable capstan and a pressure roller which can be applied to said capstan, the pressure roller and a magnetic head, past which the magnetic tape is moved, being arranged on a head mounting plate which is withdrawn in a rest or fast-wind position and which is moved forwards in a play position, in which the pressure roller, which is supported on a pivotable support of the head mounting plate, is pivoted against the capstan by the support, characterized in that switching elements are arranged on the head mounting plate within the operating range of the pressure-roller supports, which elements can be set to a switch position by the pressure-roller supports when said supports are pivoted as a result of the pressure rollers being applied to the capstans during operation of the deck, in which position the switching elements provide muting and/or track direction detection at the magnetic head or the preamplifier of the deck.

Such a magnetic tape cassette apparatus is known from DE-PS No. 33 12 136 which corresponds to U.S. Pat. No. 4,623,945. The deck can be controlled by means of three actuating rods, one rod form an eject function and two rods form fast-winding functions. The actuating rods are actuated by hand, but it is also possible to automate this actuation with the aid of a servomechanism.

There is provided a loading mechanism comprising a cassette holder arranged to be lowered into a play position and to be lifted into an unloading position. Lowering and lifting is effected by means of a lift guide on an actuating rod. The lowering and lifting operations are controlled via a lift lever comprising a follower which cooperates with the lift guide of the actuating rod.

A head mounting plate carries a magnetic head past which the magnetic tape can be moved. The head-mounting plate carries pressure rollers which are supported by means of pivotable supports and of which only one roller at a time can be pressed against its associated capstan in a deck constructed for auto-reverse operation. The forward and backward movement of the head-mounting plate is obtained by means of an actuating mechanism. During the forward movement the pressure roller to be applied to the associated capstan is pressed towards the capstan together with its support.

During fast forward and reverse operation the head-mounting plate is moved only slightly out of its play position so that there is still some contact between the magnetic head and the magnetic tape moving past this head. The amplifier may amplify the signals picked up from the rapidly passing magnetic tape by the magnetic head as chirping sounds, which may annoy the user.

From DE-PS No. 27 13 267 which corresponds to U.S. Pat. No. 4,149,203, a magnetic-tape deck is known in which a magnetic head and a pressure roller are arranged on a pivotable magnetic-head supporting lever provided with a leaf-spring switch. This switch can be actuated by the pivoting magnetic-head/supporting lever by means of a control lever to start the deck.

It is an object of the invention to improve a magnetic-tape-cassette apparatus of the type defined in the opening paragraph so as to mute the signals which can be picked up from the rapidly passing tape by the magnetic head during fast winding and so as to enable a track-direction detection to be realised.

According to the invention this object is achieved in that switching elements are arranged on the head mounting plate within the operating range of the pressure-roller supports, which elements can be set to a switch position by the pressure-roller supports when said supports are pivoted as a result of the pressure rollers being applied to the capstans during operation of the deck, in which position the switching elements provide muting and/or track direction detection at the magnetic head or the preamplifier of the deck.

During operation of the deck the pivoting pressure-roller supports can set the switching elements so as to mute, i.e. disconnect, the sound head in the fast-winding mode so that signals which may give rise to annoying chirping sounds cannot reach the amplifier circuit. In this way annoying sounds, also referred to as the "Mickey-Mouse" effect, can be avoided effectively. If muting is effected directly at the magnetic head this muting possibility can be incorporated in the deck. Moreover, track-direction detection is possible without the use of the additional switch.

In a further embodiment of the invention the switching elements are closed in the rest position and are open when a pressure roller is applied to a capstan. Such a switching method is found to be advantageous because muting is a form of switching off, which is required only when a pressure roller is disengaged from its associated capstan.

In a further embodiment of the invention the switching elements, which are constructed as leaf-spring switches, comprise sets of contact springs which are arranged between the relevant pressure-roller support and a stop on the head-mounting plate, the sets of contact springs between the pressure-roller supports being closed or opened depending on the positions of the supports. Actuation of the contact springs is then very simple and requires no additional parts.

In a further embodiment of the invention the supports are spring-loaded to urge the pressure rollers away from their associated capstans, the support whose pressure roller is clear of the associated capstan pressing the contact springs against one another and the support whose pressure roller is applied to its associated capstan allowing the contact springs to expand.

Figure 2:
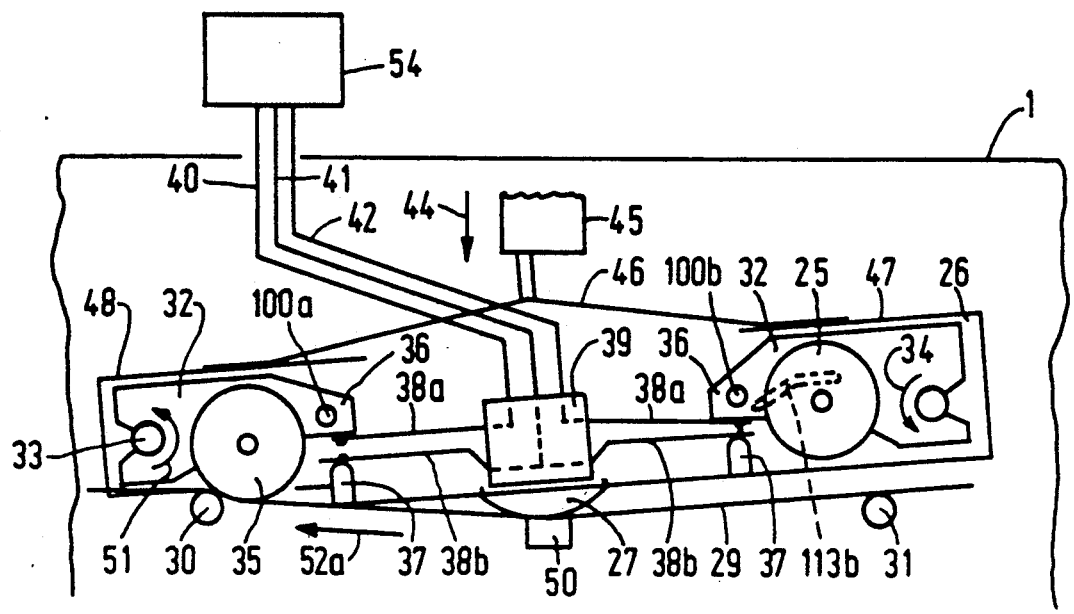
Figure 3:
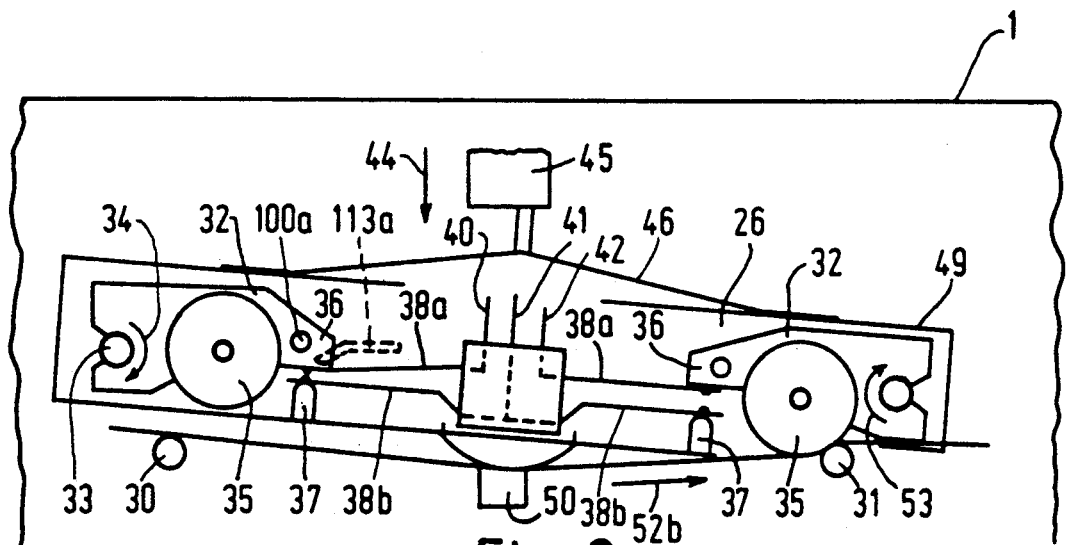
Figure 4:
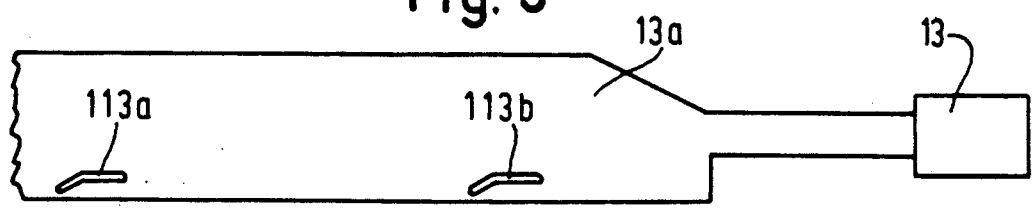

The invention will now be described in more detail, by way of example, with reference to the accompanying drawings. In the drawings:

FIG. 1 shows the deck of a magnetic-tape-cassette apparatus comprising a head-mounting plate which can be moved towards a magnetic-tape cassette and which is provided with switching elements for the purpose of muting, FIGS. 2 and 3 show two different pivotal positions of the head-mounting plate in its forward position and the corresponding switching positions of the switching elements, FIG. 4 shows an actuating rod of the deck, which rod comprises projections for actuating the switching elements.

The magnetic-tape-cassette apparatus 1, which is shown in simplified form in FIG. 1, comprises a cassette holder 1a containing a Compact Cassette 2. The cassette holder 1a can be lowered in a direction perpendicular to the plane of the drawing by means of a lift lever 3, whose front end 3a engages underneath coupling projections 4 of the cassette holder 1. The lift lever 3 is pivotable about a spindle 5. The lift lever 3 has a guide slot 8 in which a strip-shaped cassette retainer 9 is movable in the directions indicated by a double arrow 10. At its front end the cassette retainer 9 comprises a nose 11 which has engaged a reel hub bore 12 of the Compact Cassette 2. For selection of the tape-deck functions there is provided an actuating button 13 having an actuating rod 13a and two actuating buttons 14, 15 each having an actuating rod 14a, 15a.

Moreover, an actuating lever 21 is pivotable about a spindle 22. A slot 23 in the free end portion of the actuating lever 21 engages a pin 24 of the cassette retainer 9. The nose 11 of the cassette retainer 9 then engages one of the reel-hub bores 12 of the Compact Cassette 2. In the position of the actuating lever 21 as shown in FIG. 1 the cassette holder 1a has been lowered into its play position. The magnetic-tape-cassette apparatus is driven by a motor 25.

The magnetic-tape-cassette apparatus comprises a head-mounting plate 26 to which a magnetic head 27 is secured. In the situation illustrated in FIG. 1 the head-mounting plate has been withdrawn from the Compact Cassette 2 in the direction indicated by an arrow 28. The magnetic head 27 is then fully clear of a magnetic tape 29 wound on reel hubs, not shown, inside the Compact Cassette 2. The magnetic tape 29 moves past capstans 30 and 31 between which it extends as a taut straight portion.

Supports 32 are pivotably mounted on spindles 33 on the head mounting plate 26. Springs, not shown, impart to the supports 32 a torque about the spindles 33 in the direction indicated by an arrow 34 and in the unloaded condition they pivot the supports 32 towards the magnetic tape 29. Pressure rollers 35 are mounted for rotation on the supports 32.

Each of the supports 32 comprises a projection 36 which is oriented towards the centre of the head-mounting plate. The projections 36 face stops 37, between which contact springs 38a, 38b of a switching element 39 are situated. The contact springs 38a, 38b spring apart in unloaded condition and the are compressed when the relevant projection 36 with its support 32 is moved towards an associated stop 37.

The contact springs 38a, 38b have terminals 40, 41, 42, which depending on how they are connected inside the apparatus can provide muting either at the magnetic head or the preamplifier of this head. The contact springs 38a are extended to form terminals 40, 42. The two other contact springs 38b are electrically interconnected and connected to the terminal 41. In the situation as illustrated in FIG. 1, when the head-mounting plate is withdrawn in the direction indicated by the arrow 28, both contact spring-pairs 38a, 38b are compressed and are in contact with one another. In this position the deck is muted.

The position of the head-mounting plate 26 in FIG. 1 corresponds to the rest position. Between this rest position and the forward play positions illustrated in FIGS. 2 and 3 there is a fast-wind position, in which the head-mounting plate is not withdrawn completely and in which the head face 43 of the magnetic head 27 is just in gentle contact with the magnetic tape 29. The muting is also operative in this position because none of the pressure rollers 35 is in contact with the capstan 30 or 31.

In the auto-reverse deck for a magnetic-tape-cassette apparatus shown in the drawing a pressure roller 35 can be pressed against its associated capstan 30 in one tape-transport direction and the other pressure roller 35 can be pressed against the capstan 31 in the other tape-transport direction. For this purpose the head-mounting plate 26 is moved towards the magnetic tape 29 in the direction indicated by the arrow 44 in FIGS. 2 and 3. This is achieved by means of a slide 45, which acts on a leaf spring 46, which in its turn presses against a rearward edge 47 of the head-mounting plate 26. With the aid of mechanical guide means, not shown, the head-mounting plate 26 is tilted forwards with its left side 48 or its right side 49 during its forward movement. When said plate is tilted forwards to the left the pressure roller 35 is applied to the capstan 30 and when the side 49 is tilted forwards the pressure roller 35 is applied to the capstan 31. In both cases the sound head is pressed against the magnetic tape 29 and the pressure is increased by means of a customary pressure felt 50 of the Compact Cassette 2. When the left-hand side 48 of the head-mounting plate 26 is tilted forwards during the forward movement the left-hand support 32 is pivoted about the spindle 33 in the direction indicated by an arrow 51 when the pressure roller 35 is applied to the capstan 30. As a result of this, the projection 36 is disengaged from the stop 37 and the contact springs 38a and 38b expand on account of their spring action. The two contact springs 38a and 38b are then no longer in contact with each other. Since the left-hand contact side of the switching element 39 is open muting ceases and the sound head or the pre-amplifier is reactivated for signal reproduction. The apparatus detects that the left-hand pressure roller 35 is in contact with its associated capstan 30 and that the magnetic tape 29 is moved to the left past the magnetic head 27 in the direction indicated by the arrow 52a.

In the situation illustrated in FIG. 2 the right-hand pressure roller 35 remains spaced from the capstan 31. The spring force in the direction indicated by the arrow 34 urges the projection 36 of the right-hand support 32 further against the right-hand stop 37 and the right-hand contact springs 38a and 38b remain in contact. Since the right-hand contact springs 38a, 38b are in contact with each other the circuit in the apparatus detects that the right-hand pressure roller 35 is not in contact with the capstan 31.

In order to change the direction of tape transport the head-mounting plate 26 is moved back and forth in the direction indicated by the arrow 28 in FIG. 1, as a result of which the right-hand side 49 of the head-mounting plate 26 is now tilted forwards. As a result of this, the right-hand pressure roller 35 is now pressed against the capstan 31 so that the tape is driven in the direction indicated by the arrow 52, the left-hand pressure roller 35 being clear of its associated capstan 30. When the right-hand pressure roller is pressed against the capstan 31 the right-hand support 32 is pivoted clockwise as indicated by an arrow 53, so that the projection 36 of the right-hand support is disengaged from the associated stop 37. This results in the command: "tape-transport in the direction indicated by the arrow 52b" being given to the tape-deck circuit via the lines 41 and 42. The spring force exerted on the left-hand support 32 in the direction indicated by the arrow 34 causes the left-hand projection 36 to be pressed against the left-hand stop 37, so that the left-hand contact springs 38a and 38b, which are in contact with each other, give the command: "left-hand pressure roller 35 disengaged". Consequently, the apparatus receives the signal: "left-hand side disengaged" via the lines 40 and 41.

Thus, by means of the switching element 39 and its contact-spring pairs 38a, 38b the muting command can be given to the magnetic head 27 or the preamplifier 54 shown in FIG. 2 when the pressure rollers 35 are disengaged. If one of the pressure rollers 35 is applied to the associated capstan 30, 31 this enables a signal indicating the direction of transport of the magnetic-tape to be derived.

In addition, there is a fourth switch position of the switching elements 39, in which the two contact-spring pairs 38a, 38b are open at the same time. This open position of the two contact-spring pairs is obtained when the actuating rod 13a is pressed inwards in the direction indicated by an arrow 102. As a result of this, elements 113a, 113b (FIG. 4) secured to the actuating rod 13a are also moved in the direction indicated by the arrow 102. These elements 113a, 113b urge the support 32, whose pressure roller 35 is not in contact with the capstan 31 or 32 depending on the direction of tape transport, away from the relevant stop 37 via pins 100a, 100b arranged on the supports 32. This enables the corresponding contact spring-pair 38a, 38b to be opened. In the auto-reverse deck both contact spring-pairs are then open. This switch position can be used, for example, as a motor-stop signal in the electronic circuitry of the apparatus.

I claim:
1. A magnetic tape cassette apparatus, comprising:
    a magnetic head mounted on a head mounting plate, said plate being movable toward and away from a magnetic tape contained in a magnetic tape cassette inserted into said apparatus;
    at least a first capstan capable of frictionally engaging said magnetic tape;
    at least a first pressure roller mounted on a first support pivotably mounted on said head mounting plate, said first support serving to pivot said first pressure roller toward and away from said first capstan, characterized in that
    said apparatus further comprises means for producing muting signals to be communicated to said magnetic head or a preamplifier of said apparatus, said means including a switch mounted on said head mounting plate, said switch including first switching elements engageable by said first support.

2. A magnetic tape cassette apparatus as claimed in claim 1, wherein said apparatus further comprises:
    a second capstan capable of frictionally engaging said magnetic tape;
    a second pressure roller mounted on a second support pivotably mounted on said head mounting plate, said second support serving to pivot said second pressure roller toward and away from said second capstan; and
    said switch also includes second switching elements engageable by said second support.

3. A magnetic tape cassette apparatus as claimed in claim 2, wherein said first switching elements include a first pair of leaf springs and said second switching elements include a second pair of leaf springs.

4. A magnetic tape cassette apparatus as claimed in claim 1, wherein said first switching elements include a first pair of leaf springs.

5. A magnetic tape cassette apparatus, comprising:
    a magnetic head mounted on a head mounting plate, said plate being movable toward and away from a magnetic tape contained in a magnetic tape cassette inserted into said apparatus;
    first and second capstans, each of which is capable of frictionally engaging said magnetic tape;
    first and second pressure rollers mounted on, respectively, first and second supports pivotably mounted on said head mounting plate, said first support serving to pivot said first pressure roller toward and away from said first capstan and said second support serving to pivot said second pressure roller toward and away from said second capstan, characterized in that
    said apparatus further comprises means for producing muting and/or track direction detection signals to be communicated to said magnetic head or a preamplifier of said apparatus, said means including a switch mounted on said head mounting plate, said switch including first switching elements engageable by said first support and second switching elements engageable by said second support.

6. A magnetic tape cassette apparatus as claimed in claim 5, wherein said first switching elements include a first pair of leaf springs and said second switching elements include a second pair of leaf springs.

* * * * *